United States Patent
Erario et al.

(10) Patent No.: US 7,095,312 B2
(45) Date of Patent: Aug. 22, 2006

(54) SYSTEM AND METHOD FOR TRACKING IDENTITY MOVEMENT AND LOCATION OF SPORTS OBJECTS

(75) Inventors: John Erario, Woodhaven, NY (US); Richard Erario, Wilton, CT (US)

(73) Assignee: Accurate Technologies, Inc., Woodhaven, NY (US)

( * ) Notice: Subject to any disclaimer, the term of this patent is extended or adjusted under 35 U.S.C. 154(b) by 2 days.

(21) Appl. No.: 10/849,670

(22) Filed: May 19, 2004

(65) Prior Publication Data

US 2005/0259002 A1 Nov. 24, 2005

(51) Int. Cl.
*G08B 1/08* (2006.01)

(52) U.S. Cl. .............................. 340/323 R; 342/357.07

(58) Field of Classification Search .......... 342/357.07; 340/539.13, 323 R
See application file for complete search history.

(56) References Cited

U.S. PATENT DOCUMENTS

| | | | | |
|---|---|---|---|---|
| 3,782,730 A | 1/1974 | Horchler | | 473/353 |
| 4,673,183 A | 6/1987 | Trahan | | 473/152 |
| 4,675,816 A | 6/1987 | Brandon et al. | | 700/91 |
| 4,703,444 A | 10/1987 | Storms, Jr. et al. | | 342/463 |
| 4,736,097 A | * 4/1988 | Philipp | | 340/556 |
| 5,083,800 A | 1/1992 | Lockton | | 403/42 |
| 5,326,095 A | 7/1994 | Dudley | | 473/169 |
| 5,364,093 A | 11/1994 | Huston et al. | | 473/407 |
| 5,413,345 A | 5/1995 | Nauck | | 473/156 |
| 5,423,549 A | 6/1995 | Englmeier | | 473/353 |
| 5,469,175 A | 11/1995 | Boman | | 342/357.08 |
| 5,471,383 A | 11/1995 | Gobush et al. | | 700/91 |
| 5,480,154 A | 1/1996 | Barnhill | | 473/199 |
| 5,491,486 A | * 2/1996 | Welles et al. | | 342/357.07 |
| 5,532,677 A | 7/1996 | Miller | | 340/286.01 |
| 5,562,285 A | 10/1996 | Anfinsen et al. | | 473/155 |
| 5,626,526 A | 5/1997 | Pao et al. | | 473/156 |
| 5,626,531 A | 5/1997 | Little | | 473/353 |
| 5,658,210 A | 8/1997 | Cornell | | 473/407 |
| 5,700,204 A | 12/1997 | Teder | | 473/199 |
| 5,743,815 A | 4/1998 | Helderman | | 473/353 |
| 5,798,519 A | 8/1998 | Vock et al. | | 250/206.1 |
| 6,113,504 A | 9/2000 | Kuesters | | 473/353 |
| 6,266,008 B1 | * 7/2001 | Huston et al. | | 342/357.09 |
| 6,497,649 B1 | * 12/2002 | Parker et al. | | 600/27 |
| 6,524,199 B1 | 2/2003 | Goldman | | 473/353 |
| 6,582,328 B1 | 6/2003 | Kuta et al. | | 473/405 |
| 6,607,123 B1 | 8/2003 | Jollifee et al. | | 235/375 |

(Continued)

FOREIGN PATENT DOCUMENTS

DE   101 43 588 A1   3/2003

OTHER PUBLICATIONS

TopGolf webpage, http://www.topgolf.co.uk, Feb. 11, 2004.

*Primary Examiner*—Thomas H. Tarcza
*Assistant Examiner*—F H Mull
(74) *Attorney, Agent, or Firm*—Morgan & Finnegan, LLP

(57) ABSTRACT

A method and apparatus for tracking location and flight path attributes of one or more sports objects, associating the sports objects with individual players, mapping each sports object location and a flight path to surrounding field of play, and allowing each player to access the location and flight path attributes of their sports objects. The present invention outfits sports objects with electronic devices that receive and transmit position and location information obtained from the Global Positioning Satellite (GPS) System, without adversely affecting the sports object's ability to perform in a standard way.

34 Claims, 3 Drawing Sheets

U.S. PATENT DOCUMENTS

| | | |
|---|---|---|
| 6,634,959 B1 | 10/2003 | Kuesters ..................... 473/353 |
| 6,824,480 B1 | 11/2004 | John et al. ................... 473/415 |
| 2002/0030625 A1* | 3/2002 | Cavallaro et al. ...... 342/357.09 |
| 2002/0165046 A1 | 11/2002 | Helber ....................... 473/406 |
| 2002/0177490 A1* | 11/2002 | Yong et al. ................. 473/353 |
| 2003/0122657 A1* | 7/2003 | Hodsdon et al. ........ 340/323 R |
| 2004/0142766 A1 | 7/2004 | Savarese et al. ............ 473/353 |

* cited by examiner

SYSTEM AND METHOD FOR TRACKING IDENTITY MOVEMENT AND LOCATION OF SPORTS OBJECTS

FIELD OF THE INVENTION

The present invention relates generally to tracking moving objects, and specifically to tracking the distance, location, identity and individual flight path attributes of one or more sports objects that have been embedded with a Global Positioning Satellite (GPS) receiver and associated Radio Frequency (RF) transmitter components.

BACKGROUND OF THE INVENTION

In most sports played within a defined area involving moving or projected objects such as golf, baseball, ice hockey, football, soccer, javelin, shot-put and the like, accurate knowledge of the travel distance and flight path attributes of the moving sports objects used in the game can greatly enhance the enjoyment and competitiveness of the sport for both the participant and the observer. It may frequently be of great interest to know with a high degree of accuracy the flight path attributes of a moving sports object, such as the loft, flight duration (hang time), speed, velocity, elevation and the like.

In the game of baseball, for example, determination of the exact travel distance of a baseball struck by a contestant in a homerun derby is critical in determining a winner. In such a competition, observers and judges need to know the exact distance that each baseball played by a contestant has traveled in order to declare a winner. Since most of the baseballs invariably land in unmarked or inaccessible areas within or outside of the playing stadium, it is usually not possible to ascertain an actual distance measurement for these struck balls. An accepted standard for determining the travel distance is therefore necessarily based on guessing, estimating or measuring the distance from a previously known starting point such as home plate to a previously known distance marker at the vicinity of the final ball destination such as the outfield wall, plus or minus the guessed, estimated or measured additional distance to or from the actual final ball destination. This is potentially inefficient, inaccurate, and time consuming.

Similarly, it is extremely useful for a golfer using a driving range or a practice facility to know how far a golf ball has traveled, as well as to know the associated flight path (e.g., slice, shank, draw) in order to evaluate his/her own progress and fully benefit from the driving range experience. Currently, for each ball hit by a golfer into the driving or practice area, the distance is guessed by estimating how far from the nearest range marker the struck ball has come to rest. The golf range markers are generally placed in the field starting at 50 yards from the tee, and progress in 25 or 50 yard increments, usually to a maximum distance of 350 yards or the like. The markers are typically fixed stakes in the ground, each with a sign large enough to be seen from the multi-user teeing area that indicates the distance from the golfer by using a color selection or a simple 2 or 3 digit number.

At a typical facility, individual players visually track the ball during the flight path and estimate the final destination and travel distance, subject to the ability of the player to follow the ball flight path. The task is often complicated when a plurality of players and associated plurality of balls are used at the driving range simultaneously, resulting in frequent occasions when multiple balls are in flight. The inability to track the initial seconds of ball flight or confusing one ball with another, either in flight or on the ground, can result in not being able to visually follow the ball or accurately estimate the traveled distance. Change in natural lighting due to weather conditions and time of play produces variability in visibility and further complicates the task of estimating the traveled distance of a golf ball. Considering the lack of natural light during periods of cloudiness, darkness, or inclement weather during the day, as well as the limitations of artificial lighting at night, the problem of determining how far the ball has been hit becomes even more apparent.

Another common difficulty is encountered when a plurality of balls have already been hit and are scattered around the field of play, thereby making it difficult to keep track of one's ball. Even though range attendants periodically sweep the ball landing area with a cart or other device that scoops up previously hit balls for reuse, there are frequently many hundreds or even thousands of balls scattered around the range grounds at virtually all times that the facility is in use. Such condition diminishes the observer's ability to determine the true traveled distance of the golf ball.

Even with the aforementioned complicating factors aside, any attempt to accurately determine the travel distance depends largely on the vigilance of the player and on the accuracy of the small number of distance markers or yardage markers. In a typical driving range or practice facility, several yardage markers are placed within the range area to indicate the distance from the golfer to the yardage marker. Typically, the distances that are indicated from the yardage marker to the tee stall are not accurate. This is because the distances are not typically measured from each tee stall. Even if the distance is measured accurately from one particular tee stall, the distance becomes increasingly less accurate for each adjoining tee stall unless a new distance is measured. The distance variance can be significant in some tee stall layouts.

Additionally, in order for players to gain more benefit from the golf range experience, the ability to study each golf swing and compare different swings is very important. Currently, a coach or a professional teacher provides this role by observing or videotaping the player in action, and providing feedback on various elements of the player's swing mechanics and the like. Even though many golfers gain improvements from such teaching lessons, such approach is subjective and can be greatly enhanced with the added component of knowing precisely the various flight attributes of repeated practice strokes. Thus, there is a need for improving the process by which a person can understand the mechanics of his golf swing. This can be accomplished by allowing users to store accurately produced distance and golf ball flight attributes, to be viewed during the teaching lesson or at a later time, for the purpose of comparing the positive or negative aspects of different strokes, and the like.

In yet another example, it may be helpful, educational, entertaining and the like for a golfer playing a round of golf on a golf course to be able to know the true travel distance for each stroke played during the game, and to know accurately how each ball was hit in order to measure and evaluate his progress. U.S. Pat. No. 6,524,199 B2 discloses a GPS receiver that is deployed on a golf cart in order to determine the distance between the golf cart and other landmarks on the golf course such as a fairway, a sand trap, a water hazard, the putting green, etc. While such approach is useful in determining the distance to the various points of interest on the course, it is limited in scope by the fact that the GPS receiver is associated with the golf cart and not the golf ball. As such, it does not provide accurate information about the actual distance from the ball itself to the next target or other points of interest on the course. Nor does it provide any information about the ball flight attributes of the golf ball itself.

Methods for determining the distance traveled and flight attributes of a moving sports object are inaccurate, inefficient, and are subject to guesswork. We have now discovered a way to address the limitations of the preexisting methods that will allow users and players at various sports facilities, as well as observers, scorekeepers, spectators, sportscasters, teachers and the like, to know how far and how accurately a ball or other moving sports object has traveled.

There is a need to provide moving sports object positional and flight path information accurately. There is a need to determine the exact positional information of the moving sports object at the starting point and the final destination and at several intermediate points. There also is a need to obtain, display, store, and otherwise make available this positional information in a way that improves upon estimation, guessing and the like.

SUMMARY AND OBJECTS OF THE INVENTION

The present invention, provides a novel method and apparatus for tracking the distance, location and flight path attributes of one or more sports objects, associating the sports objects with individual (or groups of) players, mapping each sports object location and flight path to a field of play or an arena, and allowing each player or authorized user to access the location and flight path attributes of their sports object.

The sports object according to the present invention is equipped with a GPS receiver, a microprocessor, and RF (radio frequency) transmitter in its core such that the sports object is capable, upon being struck, batted, thrown, kicked or otherwise activated, of receiving and storing positioning data (referred to herein as primary data or tracking data) transmitted by GPS satellites in orbit around the earth and/or ground based pseudolites positioned around the range, course, or field of play. The sports object is also capable of transmitting its collected positioning data after coming to rest to one or more RF receivers located around the range, course, or field of play with such receivers being associated or integrated with a computer controlled data network that is in turn capable of storing such collected data for further processing and use.

The GPS receiver in the sports object is designed to give it a unique identification (ID) that differentiates it from other sports objects in use during simultaneous authorized sessions. The RF transmitter transmits that unique ID to the network server and then associates the ID to a particular authorized user at a particular starting point from which it was struck or activated.

Activation and power-up of the sports object can occur via various active or passive methods, such as passing the object through an electromagnetic or other activation field before being struck, activation initiated by object movement, or activation initiated by impact.

Thus, one aspect of the present invention is that it embeds electronic devices in sports objects in order to receive, store, manipulate and transmit location information obtained from GPS satellites or ground-based pseudolites, without adversely affecting the sports object's ability to perform in a standard way.

Another aspect of the present invention is that it comprises shock absorption for the electronic components embedded in the sports object or sports ball core.

It is an object of the present invention to capture primary information (e.g., identity and positional information at a given time) for many sports objects or sports balls in use simultaneously. Under the present invention, a plurality of primary information can be used to derive flight path attributes, such as for example, traveled distance, speed, direction, loft and trajectory. In one embodiment, aggregated flight path attributes are used to map the path taken by the sports object from an initial position to a final destination.

It is a further object of the present invention to track the movement of a plurality of sports objects in an indoor or outdoor field or arena. The embedded electronics in the sports object detect the primary information of the sports object at a given time and transmit the primary information from the sports object using an embedded transmit antenna to one or a plurality of receivers deployed in the playing field. The primary information is downloaded to a computer controlled network server for storage (for example, onto a hard drive) and archived for additional manipulation and processing. The server processor separates data based on sports object identity and further associates primary information for one or more specified sports objects with one or more specified users of the facility over the ball flight period to a specified object and displays the derived information to specified users of the facility.

According to one embodiment of the present invention, the processor associates stored data for each struck sports object with the player who struck it, and makes the data available for near real time viewing via display terminals located throughout the facility. In another embodiment, a specified portion of the stored data is made available for later viewing at the sport facility or other location by first storing the applicable derived data onto the computer hard drive, then transferring the data to storage media that can be viewed privately, such as for example, compact disk (CD), digital video disk (DVD), or the like.

It is a further object of the present invention to provide the ability to control access to system data via a system administrator, where the system administrator can set levels of access to the use of the system itself as well as to the availability of viewing or obtaining the generated data.

The foregoing objects are achieved and other features and advantages of the present invention will become more apparent in light of the following detailed description of exemplary embodiments thereof, as illustrated in the accompanying drawings.

BRIEF DESCRIPTION OF THE DRAWINGS

In the drawings, wherein similar reference characters denote similar elements throughout the several views.

DETAILED DESCRIPTION

The invention will now be described in detail with reference to the accompanying drawings. Although the present invention can be used to simultaneously track a plurality of sports objects in almost any sport, it will be described in this section with regard to one possible embodiment in the sport of golf. Generally, this embodiment relates to a system and method of tracking the distance, location and flight path attributes of a golf ball that has been struck or played during its normal course of being used. Specifically, this embodiment relates to an electronically outfitted golf ball that is capable of being tracked by a tracking system that can be installed on a golf practice range, driving range, golf course, or indoor environment.

Figure 1:
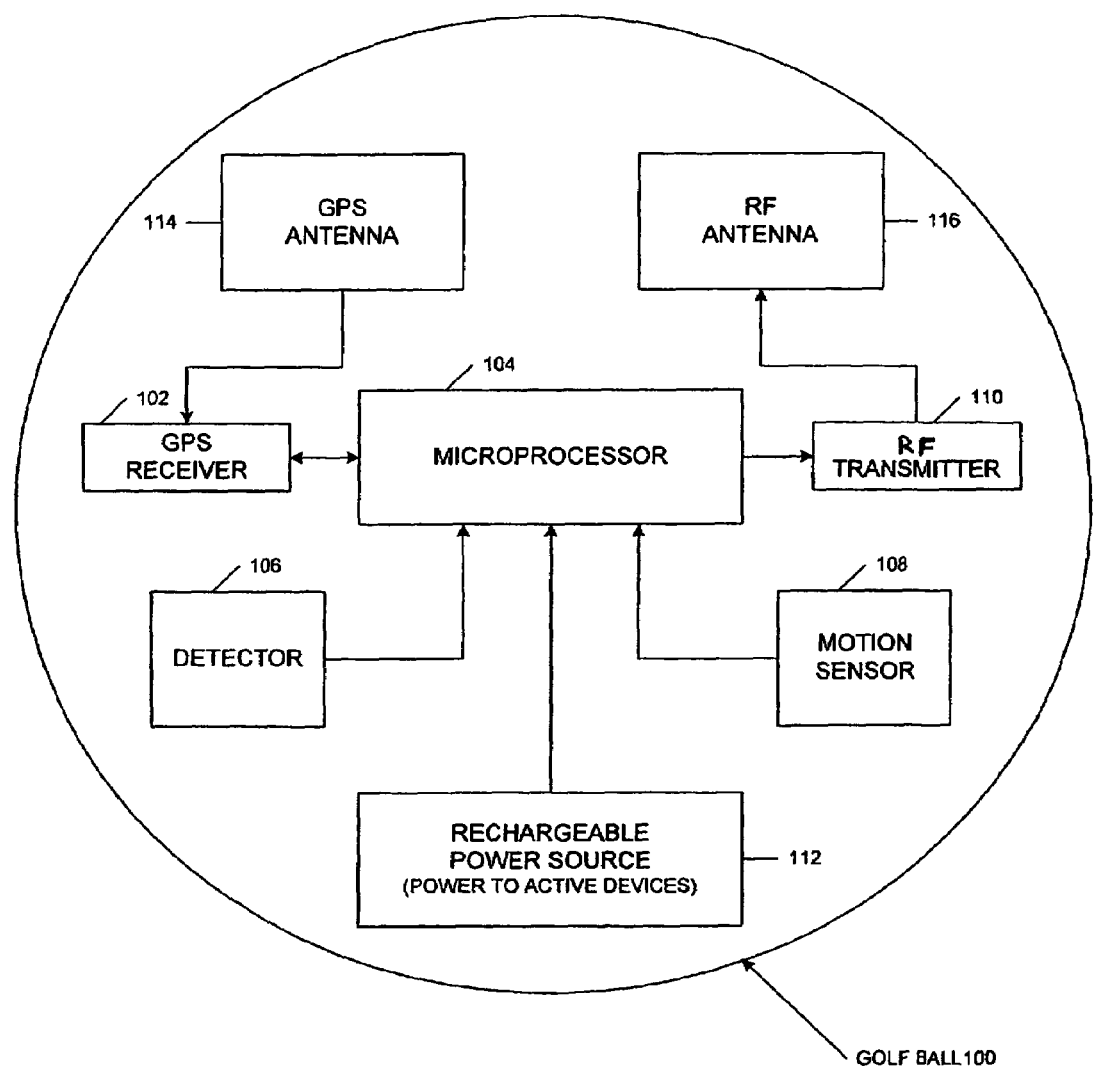
FIG. 1 is a block diagram of the electronically outfitted golf ball embodying the present invention.

FIG. 1 illustrates one embodiment of the novel golf ball. In addition to functioning as a typical golf ball, the golf ball 100 of the present invention is capable of having its location and flight path attributes tracked. Golf ball 100 is outfitted with electronic components that allow this type of information to be received, stored, manipulated and transmitted by golf ball 100. These electronic components are identified in FIG. 1 and are housed on or within the golf ball 100. The golf ball 100 includes a microprocessor 104 that performs processing tasks and controls the electronic components of golf ball 100. Preferably, the electronic components of golf ball 100 are in communication with and powered by a rechargeable power source 112 such as a battery, cell, supercapacitor, induction element or the like.

In an exemplary embodiment, the tracking data is received by golf ball 100 through GPS antenna 114 which accepts GPS satellite L1 carrier transmissions, and/or localized pseudolite signals (not shown). It should be noted that the use of other GPS satellite systems including the GLONASS system can also be utilized.

The GPS satellites in orbit are all continuously and simultaneously transmitting low power radio signals on two carrier frequencies in the UHF band called L1 and L2. The L1 carrier transmits at 1575.42 MHz and comprises the primary data received by GPS antenna 114 in golf ball 100.

In another exemplary embodiment, a GPS L1 signal contains three different types of information: a pseudo-random code, ephemeris data, and almanac data. The L1 pseudo-random code is called the C/A (Coarse Acquisition) code and is the basis for civilian GPS use at this time. It repeats every 1023 bits and modulates the L1 carrier at a 1 MHz rate. The pseudo-random code is a fundamental part of GPS and it is made up of a complex digital code that identifies which satellite is transmitting information. Additionally, a low frequency signal navigation status message known as ephemeris data is constantly transmitted by each satellite, and contains important information about the "health" status of the satellite, as well as the current date and time. This part of the signal is essential for correctly determining a position. Finally, each satellite transmits almanac data that verifies the orbital information for that satellite and for every other satellite in the GPS system. The almanac data tells the GPS receiver 102 where each satellite should be from any point on earth at any time throughout the day.

In an operational mode, GPS receiver 102 in golf ball 100 records primary GPS L1 data being sent from all visible GPS satellites as such data is received in real time by GPS antenna 114. Typically, GPS receiver 102 must be locked onto the signal of at least three satellites to calculate a 2-dimensional (2D) position (latitude and longitude) and track movement. Three-dimensional (3D) position (latitude, longitude and altitude) can be obtained with four or more satellites in view. Essentially, GPS receiver 102 compares the time that a GPS signal was transmitted by a satellite with the time that it was received. The time difference tells GPS receiver 102 how far away the satellite is. With additional data from several satellites, GPS receiver 102 can determine the 3D position of golf ball 100 at a periodic rate.

Figure 2:
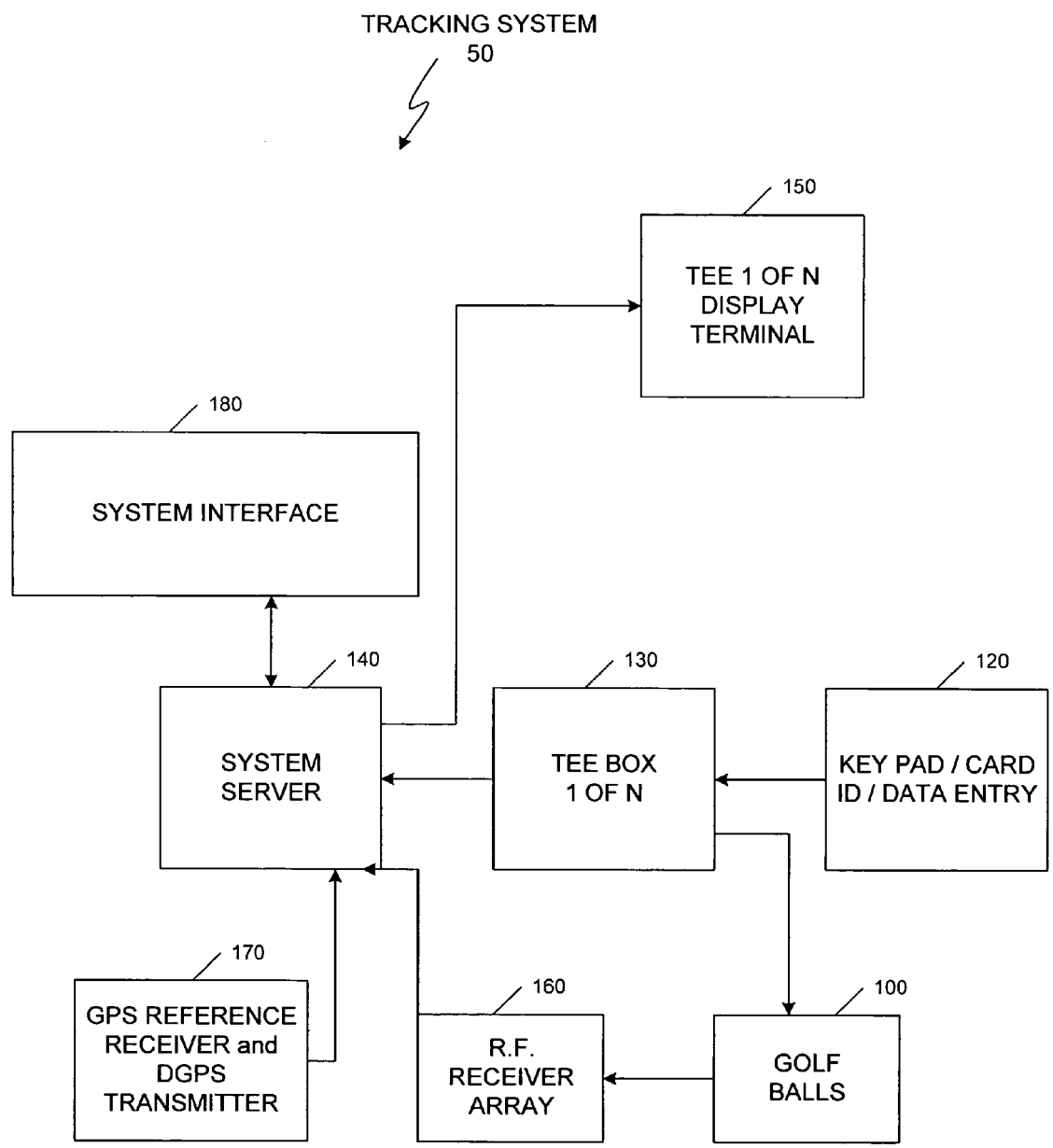
FIG. 2 is a block diagram of the golf ball tracking system embodying the present invention.
Figure 3:
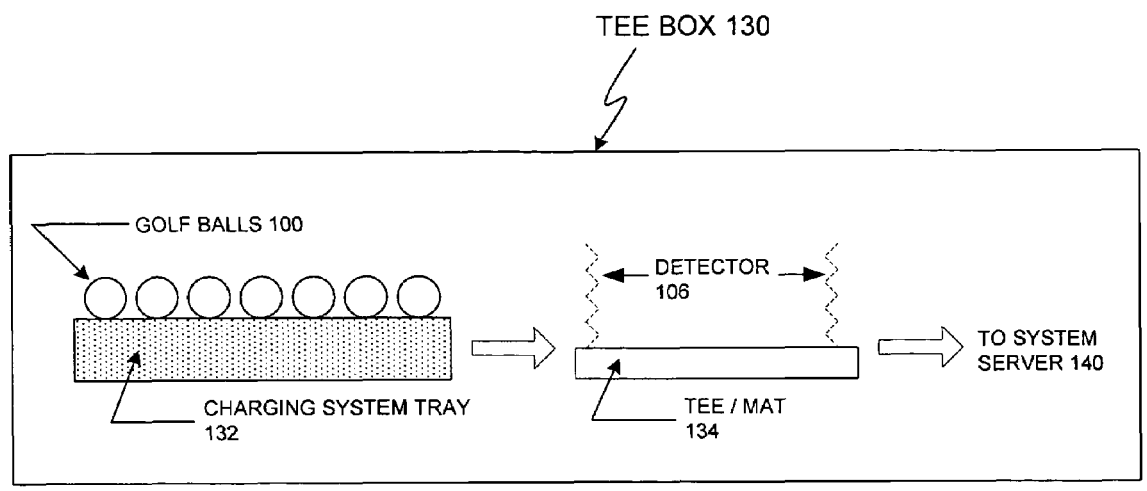
FIG. 3 is a profile view of a tee box apparatus embodying the present invention.

Source code in microprocessor 104 controls the operation of golf ball 100 components. GPS receiver 102 outputs a digital cache of primary tracking data to microprocessor 104 after a programmed period of time, continuously, or upon termination of other programmable event parameters. The primary data is then transmitted via RF transmitter 110 and RF antenna 116 to RF receiver array 160, as illustrated in FIG. 2.

Golf ball 100 can receive and transmit data, as described above, continuously, at intervals or upon the occurrence of a condition or conditions. For example, the user of golf ball 100 may only want tracking information from the moment of impact until the ball comes to rest. In that case, the microprocessor 104 can be programmed to begin transmitting data continuously from the time a motion sensor 108 senses motion or impact until the motion sensor 108 determines that golf ball 100 has come to rest. A motion sensor 108 may be any type of sensor capable of sensing motion such as an accelerometer, linear velocity sensor, infra-red sensor, compression sensor or a vibration sensor. Alternatively, microprocessor 104 may be programmed to define specific time periods for which to receive and transmit data. For example, microprocessor 104 can be programmed to receive and transmit data commencing upon impact and terminating after a period of 10 seconds has elapsed.

Preferably, golf ball 100 can detect when it has been selected for use. As illustrated in FIG. 1, golf ball 100, contains a detector 106 for detecting when it has been chosen for use. Detector 106 may be any type of sensor or device capable of detecting when a ball 100 has been placed on a tee or mat 134 which may or may not require a corresponding ball detector located in or around the tee or mat 134.

Each golf ball 100 has a unique ID that is stored in the GPS receiver 102 and is loaded into microprocessor 104 memory upon power-up. A unique ID can be any identifying data that serves to differentiate one golf ball 100 from another golf ball 100. This unique ID allows tracking system 50 to keep track of multiple golf balls 100 simultaneously.

Initialization and "first-fix" of GPS receiver 102 in golf ball 100 may first occur when rechargeable power source 112 attains its first full charge. Preferably, the initial charge occurs at charging system 232 as shown in FIG. 4, but may take place at charging system 132 in tee box 130. Whenever golf ball 100 is located in any of the charging systems, golf ball 100 is "powered-up" and is exposed to GPS signals. While charged and powered-up, golf ball 100 derives position, almanac, ephemeris, and time data (primary data) from GPS satellites. The RF Transmitter 110 is off, but the last derived primary data is stored in golf ball 100. Subsequent initialization and "first-fix" of GPS receiver 102 is only required if golf ball 100 rechargeable power source 112 becomes fully discharged or if golf ball 100 is removed from the facility.

Preferably, user arrives at tee box 130 with a supply of fully charged golf balls 100 that are placed into charging system 132 prior to being used. While in charging system 132, golf balls 100 are powered-up and the stored data consisting of last position, almanac, time and ephemeris allows GPS receiver 102 to perform a "hot start". In a "hot start"; accurate current GPS positional data and "ready-mode" is quickly achieved.

Preferably, when golf ball 100 is placed on tee 134 in tee box 130, GPS receiver 102 has already been powered up and has attained a fix. Selection and placement of golf ball 100 on tee or mat 134 causes microprocessor 104 to output data to RF receiver array 160 via RF transmitter 110 that is coupled to RF transmitter antenna 116. Such data may comprise the unique ball ID and last recorded primary data. Output of the unique ball ID along with the last recorded primary data (i.e. the last recorded GPS derived ball position) provides correlation of golf ball 100 to tee box 130, and validation of system performance.

When golf ball 100 has been selected, and power-up and GPS fix have been achieved, these and other startup events in golf ball 100 are initiated. For example, tee or mat 134 may have a known or pre-determined location and thus would serve as the starting point in the tracking of golf ball 100. Additionally, when golf ball 100 is placed on tee or mat 134 in tee box 130, field detector 106 can signal microprocessor 104 to begin receiving and/or transmitting data via GPS antenna 114 and/or RF transmitter antenna 116.

As described above, after tracking data is received by and transmitted from golf ball 100, tracking system 50 receives tracking data from golf ball 100 and translates the data into a useable form. FIG. 2 illustrates a tracking system that embodies the present invention. The tracking system 50 of the present invention is used to track the location and flight path attributes of a golf ball 100 which has been embedded with miniature electronics as described above.

Tracking system 50 includes an RF receiver or an RF receiver array 160 for receiving data transmitted by golf ball 100. RF receiver array 160 can utilize any of the various RF frequency ranges permitted in the deployed environment, for example 800 MHz or 2.4 GHz. According to one embodiment of the present invention, RF receiver array 160 includes a receiving antenna, digital signal processor, filter and RF cables.

Data transmitted from golf ball 100 is received by RF receiver array 160 which transmits the data directly to system server 140. This process may occur in substantially real time. System server 140 may be a PC server having a storage medium and an operating system or any equivalent thereof. The operating system can be responsible for providing the framework for executing the system software. The storage medium can be any medium commonly used to store data such as a hard drive, disk or tape. In one embodiment, for example, a hard drive can be used for storing primary or processed data that is received from golf ball 100 via RF receiver array 160.

One possible RF receiver array 160 configuration might comprise a plurality of RF receivers located strategically around the driving range, golf course or hitting area to assure successful reception of the tracking data transmitted by a plurality of golf balls 100 at any particular time. Another possible configuration might comprise a single RF receiver wherein the signal strength of the RF transmitter in golf ball 100 and the sensitivity of the receiver can accommodate the longest drive possible on the driving range. In either configuration, RF receiver array 160 is in communication with system server 140 for processing the tracking data.

The system server 140 can be coupled to a single or to a plurality of tee boxes or stalls. Each tee box 130 is connected to a device for collecting and processing one or more types of user authenticating data, for example, personal identification number or code inserted via key pad input, data stored in an ID card, biometric identifications, and the like. Key pad/card ID 120 allows users of tracking system 50 to obtain a valid ID and associates the ID with a specific play session or a registered user. Under the present invention each tee box 130 can be coupled to a single key pad/card ID 120. Alternatively, one or more tee boxes 130 can share the same key pad/card ID 120. According to the present invention, processing of the user authentication data collected at key pad/card ID 120 can be performed at system server 140, at key pad/card ID 120, or at other administrative areas of tracking system 50.

System server 140 is further coupled to a single or a plurality of display terminals 150. One embodiment has display terminals 150 located within the viewing area of each tee box 130, providing each user with a variety of audio and/or visual information relating to the golf balls 100 in play. In another embodiment, display terminals 150 may be located in the club house, pro shop, bar or restaurant for later viewing of data by the user. Alternatively, data can be downloaded to various transportable media such as a CD or DVD.

A GPS reference receiver 170 can be connected to system server 140 in FIG. 2 to correct common mode errors that can degrade the GPS signal and affect accuracy. Some potential errors include ionosphere and troposphere delays (the satellite signal slows as it passes through the atmosphere), receiver clock errors (a receiver's built-in clock may not be as accurate as the atomic clocks onboard the GPS satellites), orbital or ephemeris errors (inaccuracies in the satellite's reported location).

Combining GPS L1 signal data (i.e. primary positional data) from active GPS receivers 102 with Differential GPS (DGPS) reference data in system server 140 can help reduce or eliminate these errors. Differential GPS reference receiver 170 is placed at an exact known location on the grounds of the facility. Since reference receiver 170 knows its exact location, it can determine errors in the satellite signals by measuring the ranges to each satellite by using the signals received, and comparing these measured ranges to the actual ranges calculated from its known position. The difference between the measured and calculated range for each satellite in view becomes a "differential correction".

The differential corrections for each tracked satellite are formatted into a correction message and transmitted to system server 140. These differential corrections are applied to the GPS receiver 102 calculations, removing many of the common errors and improving accuracy. Reference receiver 170 determines the error components and provides corrections to system server 140 in real time. The correctional data is sent from the DGPS reference receiver 170 in the form of a DGPS correction signal.

Referring to FIG. 2, tracking system 50 comprises a system interface 180, coupled to system server 140. System interface 180 allows the administrator of the tracking system 50 to control the system. While system interface 180 is shown as a separate logical block from system server 140, the present invention does not preclude the combination of both entities as a single physical entity.

In one exemplary embodiment of tracking system 50 illustrated in FIG. 2, the user enters identification and other information for billing, data analysis, data storage, and the like as may be required via keypad/card ID 120. If authorization to access tracking system. 50 is granted, the user will be given authorization to use a specified tee box 130. The user can then proceed to place golf ball 100 in a holding tray to obtain a fix before proceeding to place golf ball 100 on tee or mat 134. Alternatively, the user can wait for golf ball 100 to be supplied automatically from a feeder (not shown). When golf ball 100 is placed on tee or mat 134, golf ball 100 transmits its unique identification and GPS derived position and time to system server 140, while the tee box 130 simultaneously sends the position of the ball 100 to the system server 140. System server 140 validates the transmitted tracking data and sends an indication of system readiness to the user via display terminal 150 or other audio-video medium. If the system is not ready due to some system component malfunction (such as a defective or uncharged ball), an indication symbol, light, or the like will signal the user the existence of such condition. Otherwise, after golf ball 100 transmits its GPS fix from tee box 130, it is ready to be played.

When golf ball 100 is struck, motion sensor 108 senses acceleration and records and stores tracking data (positional data, time, ID) for a period of time associated with the maximum range of flight time of a normally struck golf ball, such as for example, 10 seconds or until golf ball 100 comes to rest, as determined by motion sensor 108. Tracking data is captured by golf ball 100 at several intervals during the flight time period and is stored in microprocessor 104 located in golf ball 100. After data capture is complete, the tracking data is then transmitted to RF receiver array 160 via RF transmitter 110 embedded in golf ball 100.

In one embodiment of the present invention, positional data may be captured by golf ball 100 upon activation at a rate of once per second. In another embodiment, data may be captured at other rates, such as for example at multiple intervals per second.

In one embodiment of the present invention, golf ball 100 transmits the captured tracking data continuously during the ball flight without storing this data. Alternatively, in yet another embodiment, some data is stored in microprocessor 104 embedded in golf ball 100, while other data is transmitted during the ball flight path.

System server 140 which is controlled by system interface 180 processes the tracking data obtained from golf ball 100 and routes it to the appropriate display terminal 150 for user review. In one embodiment, the user is given the option of storing or downloading the data to a removable medium such as a DVD.

In another embodiment, whenever golf ball 100 is activated and GPS antenna 114 and GPS receiver 102 receive primary data, RF transmitter 110 and RF transmitter antenna 116 transmit such primary data continuously to RF receiver array 160 for a period of time or until cessation of motion. Subsequently, golf ball 100 is retrieved and recharged prior to next use.

According to the present invention, detector 106 in golf ball 100 senses its placement on tee or mat 134 in tee box 130, and signals the microprocessor 104 to commence initial data transmission. Initial data transmission consists of output of unique ball ID and output of primary data to system server 140. Output of such primary data may take place via RF transmitter 110 and RF transmitter antenna 116 to RF receiver array 160, which is in communication with the system server 140. This series of startup events is processed by the system server 140 and serves to identify each golf ball 100 prior to the user striking it into the field of play, confirm that it is adequately charged, verify that it is ready to receive and send data, and correlate its position with an active tee box 130.

Charging system 132 in tee box 130 holds and inductively charges golf balls 100 once the user arrives at tee box 130. Charging system 132 consists of an energy sensing loop or antenna or similar device, and the electronic circuitry necessary to properly supply a rechargeable power source in golf ball 100 with such rechargeable power source 112 consisting of a cell, battery, or supercapacitor. Alternatively golf balls 100 may arrive at a charging system 132 automatically and fully charged. While in charging system 132, GPS receiver 102 and microprocessor 104 in golf ball 100 will be powered up, attain a fix (i.e. acquire current GPS positional data), and be in standby mode until detector 106 senses that placement of golf ball 100 onto tee or mat 134 has occurred, whereupon initial data transmission take place.

Other alternative embodiments or implementations according to the various teachings of the present invention will be understood by those skilled in the art and are achieved without departing from the spirit and scope of the invention. It is therefore intended that the present invention is not limited to the disclosed embodiments described herein but should be defined in accordance with the claims that follow.

We claim:

1. A sports object capable of receiving, storing and transmitting tracking data comprising:
   a receiver for receiving tracking data;
   a transmitter for transmitting the tracking data;
   a programmable microprocessor for controlling the receiver and the transmitter wherein tracking data is received by the sports object through the receiver such that the tracking data passes through the microprocessor before the tracking data is transmitted from the sports object by the transmitter;
   a rechargeable power source for powering the receiver, transmitter and programmable microprocessor, the receiver, transmitter, programmable microprocessor and rechargeable power source being embedded in the sports object; and
   a detector embedded in the sports object for detecting when the sports object has been selected for use.

2. The sports object of claim 1 further comprising a means for identifying the sports object wherein the identity is stored in the microprocessor and can be transmitted from the sports object by the transmitter to a remote receiver.

3. The sports object of claim 1 wherein the sports object is a golf ball having a motion sensor.

4. The golf ball of claim 3 wherein the microprocessor is programmed to receive and transmit tracking data once the detector detects that the golf ball has been selected for use.

5. The golf ball of claim 3 wherein the microprocessor is programmed to receive and transmit tracking data in a predetermined manner once the detector detects that the golf ball has been selected for use.

6. The golf ball of claim 3 wherein the microprocessor is programmed to receive and transmit tracking data continuously once the detector detects that the golf ball has been selected for use.

7. The golf ball of claim 3 wherein the microprocessor is programmed to receive and transmit tracking data periodically once the detector detects that the golf ball has been selected for use.

8. The golf ball of claim 3 wherein the microprocessor is programmed to receive and transmit tracking data for a predetermined period of time once the detector detects that the golf ball has been selected for use.

9. The sports object of claim 1 wherein the receiver comprises an antenna embedded in the sports object.

10. The sports object of claim 1 wherein the transmitter comprises an antenna embedded in the sports object.

11. The sports object of claim 1 further comprising a motion sensor embedded in the sports object.

12. The sports object of claim 11 wherein the motion sensor comprises an accelerometer.

13. The sports object of claim 11 wherein the motion sensor comprises a linear velocity sensor.

14. The sports object of claim 11 wherein the motion sensor comprises an infrared sensor.

15. The sports object of claim 11 wherein the motion sensor comprises a vibration sensor.

16. The sports object of claim 11 wherein the microprocessor is programmed to receive and transmit tracking data once the motion sensor senses that the sports object is in motion until the sports object comes to rest.

17. The sports object of claim 11 wherein the microprocessor is programmed to receive and transmit tracking data in a predetermined manner once the motion sensor senses that the sports object is in motion until the sports object comes to rest.

18. The sports object of claim 11 wherein the microprocessor is programmed to receive and transmit tracking data continuously once the motion sensor senses that the sports object is in motion until the sports object comes to rest.

19. The sports object of claim 11 wherein the microprocessor is programmed to receive and transmit tracking data periodically once the motion sensor senses that the sports object is in motion until the sports object comes to rest.

20. The sports object of claim 11 wherein the microprocessor is programmed to receive and transmit tracking data once the motion sensor senses that the sports object has been placed in motion.

21. The sports object of claim 11 wherein the microprocessor is programmed to receive and transmit tracking data in a predetermined manner once the motion sensor senses that the sports object has been placed in motion.

22. The sports object of claim 11 wherein the microprocessor is programmed to receive and transmit tracking data continuously once the motion sensor senses that the sports object has been placed in motion.

23. The sports object of claim 11 wherein the microprocessor is programmed to receive and transmit tracking data periodically once the motion sensor senses that the sports object has been placed in motion.

24. A sports object tracking system comprising:
   a radio frequency receiver for receiving tracking data transmitted from a transmitter,
   a system server for receiving the tracking data from the radio frequency receiver;
   a display device in communication with a programmable microprocessor, wherein the tracking data is displayed;
   a data entry device to which a user of the sports object tracking system inputs information; and
   a rechargeable power source for powering the receiver, transmitter and programmable microprocessor, the receiver, transmitter, programmable microprocessor and rechargeable power source being embedded in the sports object; and
   a detector embedded in the sports object for detecting when the sports object has been selected for use.

25. The sports object tracking system of claim 24 further comprising a system interface for accessing and controlling the system server.

26. The sports object tracking system of claim 24 wherein the tracking data is viewed in substantially real time.

27. The sports object tracking system of claim 24 wherein the tracking data is stored for delayed viewing.

28. The sports object tracking system of claim 24 further comprising a GPS reference receiver.

29. The sports object tracking system of claim 24 wherein the sports object is a golf ball.

30. The golf ball tracking system of claim 29 further comprising a tee box.

31. A sports object and tracking system comprising:
   a sports object having a receiver for receiving tracking data wherein the sports object has:
   a transmitter for transmitting the tracking data; and
   a programmable microprocessor for controlling the receiver and the transmitter wherein tracking data is received by the sports object through the receiver such that the tracking data passes through the microprocessor before the tracking data is transmitted from the sports object by the transmitter, the sports object further having:
   a rechargeable power source for powering the receiver, transmitter and microprocessor such that the sports object is capable of being tracked by a tracking system wherein the tracking system has a radio frequency receiver for receiving tracking data transmitted from the transmitter, and the receiver, transmitter, microprocessor and power source are embedded in the sports object;
   a system server for receiving the tracking data from the radio frequency receiver;
   a display device in communication with the system server wherein the tracking data is displayed; and
   a detector embedded in the sports object for detecting when the sports object has been selected for use.

32. The sports object tracking system of claim 31 further comprising a data entry system.

33. A method for tracking a sports object comprising the steps of:
   receiving tracking data in a sports object, the sports object having embedded a receiver, a transmitter, a programmable microprocessor a rechargeable power source, and a detector embedded in the sports object for detecting when the sports object has been selected for use;
   transferring the tracking data through the microprocessor to the transmitter;
   transmitting the tracking data from the sports object to a receiver contained in a tracking system;
   processing the tracking data through a system server; and
   displaying the tracking data.

34. A method for tracking a sports object of claim 33 further comprising the step of entering data into a data entry system.

* * * * *